(12) United States Patent  (10) Patent No.: US 12,276,845 B2
Haase  (45) Date of Patent: Apr. 15, 2025

(54) OPTICAL CONNECTOR USING THERMAL EXPANSION TO MAINTAIN ALIGNMENT

(71) Applicant: 3M INNOVATIVE PROPERTIES COMPANY, St. Paul, MN (US)

(72) Inventor: Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 370 days.

(21) Appl. No.: 17/922,459

(22) PCT Filed: Apr. 30, 2021

(86) PCT No.: PCT/IB2021/053642
§ 371 (c)(1),
(2) Date: Oct. 31, 2022

(87) PCT Pub. No.: WO2021/224743
PCT Pub. Date: Nov. 11, 2021

(65) Prior Publication Data
US 2023/0168439 A1   Jun. 1, 2023

Related U.S. Application Data

(60) Provisional application No. 63/019,511, filed on May 4, 2020.

(51) Int. Cl.
G02B 6/38 (2006.01)
G02B 6/30 (2006.01)
G02B 6/42 (2006.01)

(52) U.S. Cl.
CPC ........... *G02B 6/3826* (2013.01); *G02B 6/30* (2013.01); *G02B 6/3885* (2013.01);
(Continued)

(58) Field of Classification Search
CPC .. G02B 6/3826; G02B 6/4228; G02B 6/4266; G02B 6/30; G02B 6/3885; G02B 6/4214
See application file for complete search history.

(56) References Cited

U.S. PATENT DOCUMENTS 11,372,164 B2 * 6/2022 Sabano ............... G02B 6/30
2014/0056591 A1 * 2/2014 McColloch ......... G02B 6/4267
398/135

FOREIGN PATENT DOCUMENTS

JP  2002204017 A  *  7/2002
JP  2020030340 A     2/2020
(Continued)

OTHER PUBLICATIONS

"PRIZM® Expanded Beam Ferrules and Components", retrieved from the internet on Nov. 18, 2022, URL <http://www.usconec.com/products/ferrules/prizm-lightturn_ferrule.htm>_5 Pages.
(Continued)

*Primary Examiner* — Ryan A Lepisto
*Assistant Examiner* — Erin D Chiem
(74) *Attorney, Agent, or Firm* — Jonathan L. Tolstedt

(57) ABSTRACT

An optical assembly includes an optical ferrule configured to receive an input light ray through an input location on a major input surface of the optical ferrule along a first direction for coupling to an optical waveguide secured to the optical ferrule, the optical ferrule including a reference location, such that a change in a temperature of the optical assembly causes the input light ray and the input location, but not the reference location, to move respective distances d1 and d2 along a same direction along a same axis, wherein a magnitude of d1-d2 is δ, and a maximum of magnitudes of d1 and d2 is greater than 10 times δ.

20 Claims, 3 Drawing Sheets

(52) U.S. Cl.
CPC ......... *G02B 6/4214* (2013.01); *G02B 6/4228* (2013.01); *G02B 6/4266* (2013.01)

(56) References Cited

FOREIGN PATENT DOCUMENTS

| | | | |
|---|---|---|---|
| WO | 2014055226 A1 | 4/2014 | |
| WO | 2015176050 A1 | 11/2015 | |
| WO | WO-2018164954 A1 * | 9/2018 | ........... G02B 6/3854 |
| WO | WO-2019200066 A1 * | 10/2019 | ........... G02B 6/3825 |
| WO | 2020003118 A1 | 1/2020 | |
| WO | 2020003189 A1 | 1/2020 | |
| WO | 2020202010 A1 | 10/2020 | |
| WO | 2021038497 A1 | 3/2021 | |

OTHER PUBLICATIONS

Hughes, "A Single-Mode Expanded Beam Separable Fiber Optic Interconnect for Silicon Photonics", OSA Technical Digest, Optical Fiber Communication Conference (OFC), 2019, 3 Pages.
International Search Report for PCT Application No. PCT/IB2021/053642, mailed on Jul. 19, 2021, 4 pages.

* cited by examiner

OPTICAL CONNECTOR USING THERMAL EXPANSION TO MAINTAIN ALIGNMENT

CROSS REFERENCE TO RELATED APPLICATIONS

This application is a national stage filing under 35 U.S.C. 371 of PCT/IB2021/053642, filed Apr. 30, 2021, of U.S. Provisional Application No. 63/019,511, filed May 4, 2020, the disclosures of which is incorporated by reference in their entirety herein.

SUMMARY

In some aspects of the present description, an optical assembly is provided, including an optical ferrule, the optical ferrule configured to receive an input light ray through an input location on a major input surface of the optical ferrule along a first direction for coupling to an optical waveguide secured to the optical ferrule, the optical ferrule having a reference location, such that a change in a temperature of the optical assembly causes the input light ray and the input location, but not the reference location, to move respective distances d1, d2 along a same direction along a same axis, wherein a magnitude of d1-d2 is δ, and a maximum of magnitudes of d1 and d2 is greater than 10 δ.

In some aspects of the present description, an optical assembly is provided, including an optical ferrule having an optical waveguide secured thereto; and an optical component, the optical ferrule configured to receive light from the optical component and couple the received light to the optical waveguide, such that, when the optical ferrule and the optical component are at a temperature T1, the optical ferrule is aligned to the optical component to optimize an optical coupling of the received light to the optical waveguide; moving the received light by a first distance while keeping the temperature of the optical ferrule and the optical component at T1, reduces the optical coupling of the received light to the optical waveguide by at least 10%; and changing the temperature of the optical ferrule and the optical component from T1 to cause the received light to move by the first distance, reduces the optical coupling of the received light to the optical waveguide by less than about 10%.

In some aspects of the present description, an optical assembly is provided, including an optical ferrule having an optical waveguide secured thereto; an optical component, the optical ferrule configured to receive light from the optical component through an input location thereof and optically couple the received light to the optical waveguide; and a cradle securing the optical ferrule therein and aligning the optical ferrule to the optical component, such that when a temperature of the optical assembly changes, each of the received light and the input location moves along a same direction along a same axis, and the optical coupling of the received light to the optical waveguide reduces by no more than about 10%.

In some aspects of the present description, an optical assembly is provided, including an optical ferrule assembly and a cradle. The optical ferrule assembly includes an optical ferrule with an attachment area and a light redirecting side, and an optical waveguide secured to the attachment area. The optical ferrule of the optical ferrule assembly may be secured within the cradle. When an input light ray enters the optical ferrule through an input location thereof and optically couples to the optical waveguide after being redirected by the light redirecting side, a change in a temperature of the optical ferrule assembly causes the input light ray and the input location, but not a reference location of the optical assembly, to move so that the input light ray continues to enter the optical ferrule through the input location.

DETAILED DESCRIPTION

Figure 1:
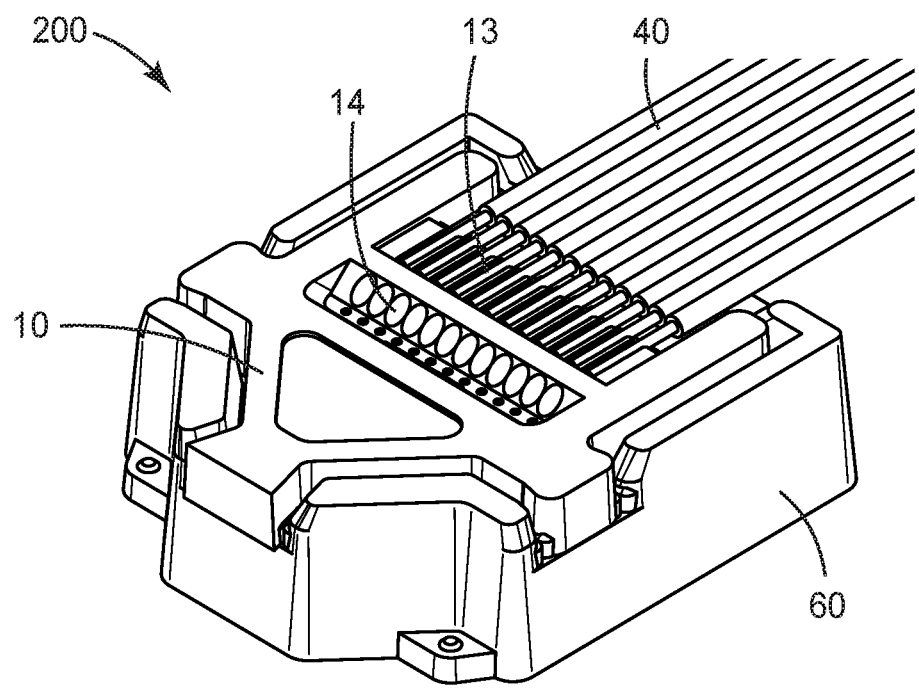
FIG. 1 is a perspective view of an optical assembly, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

There exist optical systems in which an expanded (i.e., substantially collimated) light beam can translate laterally with changes in temperature. For example, this can occur when a light beam travels at an oblique angle through a slab of material (e.g., glass with parallel input and output surfaces). Because the index of refraction of the material can change with temperature, the angle of the beam traveling through material may change. Typically, the output beam remains substantially parallel to the input beam, but the lateral offset between the output and input beams changes with temperature. If this beam is captured by a conventional optical ferrule and focused into an optical fiber, the result may be temperature-dependent loss of efficiency due to the resulting misalignment of the optical ferrule with the expanded beam. Expanded beam connectors between planar waveguides and optical fibers (e.g., using prism or grating couplers and collimation lenses) may also suffer from temperature-dependent offsets of the expanded beam.

According to some aspects of the present description, components of an optical assembly may be configured such that the thermal expansion and/or contraction of the components of the assembly (e.g., an optical ferrule) is used to substantially maintain alignment between the optical waveguides and the corresponding optical components over a wide temperature range. For example, the thermal expansion/contraction of the optical ferrule may be used to move the input window of the optical ferrule to precisely track the lateral offset of the expanded beam during a temperature change.

In some embodiments, an optical assembly includes an optical ferrule. In some embodiments, the optical ferrule is configured to receive an input light ray through an input location on a major input surface (e.g., a surface of the ferrule facing into a mating component, or facing an optical component providing the input light ray) of the optical ferrule along a first direction for coupling to an optical waveguide (e.g., an optical fiber) secured to the optical ferrule. In some embodiments, the optical ferrule may have a reference location, such that a change in a temperature (e.g., a change of at least 5 degrees or at least 10 degrees or at least 15 degrees Celsius) of the optical assembly (causing thermal expansion or contraction of system components) causes the input light ray and the input location, but not the reference location, to move respective distances d1 and d2 along a same direction (e.g., +x direction) along a same axis (e.g., x-axis), wherein a magnitude of d1-d2 is δ, and a maximum of magnitudes of d1 and d2 is greater than 10 times δ. Said another way, in some embodiments, the optical ferrule may be configured such that there is at least one location (i.e., the "reference location") that stays substantially in place during thermal changes (e.g., expansion or contraction of the optical ferrule or other system components). For example, the optical ferrule may be designed such that it has a center of thermal expansion which remains in a fixed location relative to a mating piece (e.g., a cradle configured to mate with and hold the optical ferrule). In some embodiments, the optical assembly may be configured such that it has an operating temperature range such that a change in the temperature over the operating temperature range causes the input light ray and the input location, but not the reference location, to move respective distances d1 and d2 along a same direction (e.g., +x) along a same axis (e.g., the x-axis). In some embodiments, the magnitude of d1-d2 is δ, and a maximum of magnitudes of d1 and d2 is greater than 10 times δ. In some embodiments, the operating temperature range for the optical assembly may be from about −40 degrees Celsius (C) to about 100 degrees C.

In some embodiments, an increase in temperature of the optical assembly may cause the input light ray and the input location to move away from the reference location. In some embodiments, the increase in temperature may cause the input light ray and the input location to move toward the reference location. In some embodiments, the reference location may be at or near a major surface of the optical ferrule. For example, the reference location may be within about 5 microns or about 10 microns or about 15 microns of a mating surface of the optical ferrule (e.g., the surface facing into the corresponding mating component of the ferrule). In some embodiments, the major surface may be the major input surface of the optical ferrule. That is, the reference location may be within about 5 microns or about 10 microns or about 15 microns of the major input surface.

In some embodiments, the optical ferrule may be configured to redirect the input light ray received from the first direction along a second, different direction. In some embodiments, the optical ferrule may have a light redirecting side or surface which may reflect the input light ray along the second direction. In some embodiments, the optical ferrule may include an attachment area (e.g., grooves or channels) for securing one or more optical waveguides (e.g., optical fibers). In some embodiments, the optical ferrule may have a light redirecting surface or light redirecting side for receiving the light along a first direction from the optical waveguides (secured to the attachment area) and redirecting the received light along a different direction. In some embodiments, the reference location and the attachment area may be positioned on the same side of the light redirecting side. In some embodiments, the reference location and the attachment area may be positioned on opposite sides of the light redirecting side. In some embodiments, the optical ferrule may receive the input light ray from an optical component. In some embodiments, the optical component may be, but is not limited to, a photonic integrated circuit (PIC), a lens, a prism, a grating, a sensor, or a vertical cavity surface emitting laser (VCSEL). In some embodiments, one or more properties of the optical component itself may change with a change in temperature. For example, when there is a sufficient change in temperature, the pitch of an optical grating may change, as well as the refractive index of the material of the grating. For example, as temperature increases, the pitch of the grating may increase and the refractive index may decrease, causing the input light ray (the light ray emitted by the optical component) to move laterally (e.g., after going through a collimating lens). This change in properties and the resulting lateral shift may be compensated for as described herein (e.g., designing the thermal expansion of the optical ferrule to compensate for the lateral shift.) In some embodiments, a change in a temperature of the optical component may cause the input light ray to move, while a change in a temperature of the optical ferrule may cause the input location to move.

In some embodiments, the optical assembly may include a cradle configured to secure the optical ferrule therein and to align the optical ferrule to an optical component. For example, in some embodiments, the cradle may be mounted on an integrated circuit, printed circuit board, or similar substrate positioned relative to an optical component on the same substrate, such that an optical ferrule mated with the cradle is held in an appropriate position relative to the optical component. In some embodiments, the optical component may be, but is not limited to, a PIC, a lens, a prism, a grating, a sensor, or a VCSEL. In some embodiments, the cradle may define the reference location of the optical ferrule. That is, the reference location of the optical ferrule may be defined with respect to a corresponding location on the cradle. In some embodiments, the coefficient of thermal expansion of the cradle may be significantly less than the coefficient of thermal expansion of the optical ferrule (e.g., by at least a factor of 5, or at least a factor of 10, or at least a factor of 15).

According to some aspects of the present description, an optical assembly includes an optical ferrule having an optical waveguide (e.g., an optical fiber) secured thereto; and an optical component (e.g., such as a PIC, a lens, a prism, a grating, etc.). In some embodiments, the optical waveguide may be an optical fiber with a cord having a diameter of between about 5 and about 15 microns. In some embodiments, the optical ferrule may be configured to receive light from the optical component and couple the received light to the optical waveguide. In some embodiments, the optical ferrule may be configured such that, when the optical ferrule and the optical component are at a temperature T1, the optical ferrule is substantially aligned to the optical component, optimizing the optical coupling of the received light to the optical waveguide. In some embodiments, moving the received light by a first distance while keeping the temperature of the optical ferrule and the optical component at T1, may reduce the optical coupling of the received light to the optical waveguide by at least 10% or at least 15% or at least 20%. In some embodiments, changing the temperature of the optical ferrule and the optical component from T1 may cause the received light to move by the first distance, reducing the optical coupling of the received light to the optical waveguide by less than about 5% or less than about 10%.

According to some aspects of the present description, an optical assembly includes an optical ferrule having an optical waveguide (e.g., an optical fiber) secured thereto, an optical component (e.g., such as a PIC, a lens, a prism, a grating, etc.), and a cradle securing the optical ferrule therein and aligning the optical ferrule to the optical component. In some embodiments, the optical ferrule may be configured to receive light from the optical component through an input location and optically couple the received light to the optical waveguide. In some embodiments, when a temperature of the optical assembly changes, each of the received light and the input location may move along a same direction (e.g., +x or −x) along a same axis (e.g., the x-axis), and the optical coupling of the received light to the optical waveguide may be reduced by no more than about 5% or about 10%. In some embodiments, when the temperature of the optical assembly changes, there may be at least one other location (i.e., a second location, different from the input location) on at least one of the optical ferrule and the cradle which substantially does not move (e.g., a reference location, which may be a center of thermal expansion for either the optical ferrule or the cradle, or both).

According to some aspects of the present description, an optical assembly includes an optical ferrule assembly and a cradle. In some embodiments, the optical ferrule assembly may include an optical ferrule with an attachment area and a light redirecting side (e.g., a reflective surface disposed so as to reflect light from a first direction toward a second direction), and an optical waveguide (e.g., an optical fiber) secured to the attachment area. In some embodiments, the optical ferrule of the optical ferrule assembly is secured within the cradle. In some embodiments, when an input light ray enters the optical ferrule through an input location and optically couples to the optical waveguide after being redirected by the light redirecting side, a change in a temperature of the optical ferrule assembly may cause the input light ray and the input location, but not a reference location of the optical assembly, to move so that the input light ray continues to enter the optical ferrule through the input location. In some embodiments, the reference location may be a center of thermal expansion for the optical ferrule and/or the cradle. In some embodiments, the optical assembly may also include an optical component configured to emit the input light ray. In some embodiments, the cradle may be configured to align the optical ferrule and the optical component. In some embodiments, the optical component may be, but is not limited to, a PIC, a lens, a prism, a grating, a sensor, or a VCSEL.

Turning now to the figures, FIG. 1 is a perspective view of an optical assembly according to the present description. An optical assembly 200 includes an optical ferrule 10 and a mating cradle 60 for securing the optical ferrule 10 and aligning it with an optical component (not shown in FIG. 1, but discussed elsewhere herein). In some embodiments, the optical ferrule 10 includes an attachment area 13, to which one or more optical waveguides 40 may be attached. For example, a single optical ferrule may be attached to 8, 12, or 16 optical waveguides 40, or any other appropriate number. In some embodiments, the number of optical waveguides 40 may match a corresponding number of optical waveguides in an optical component (e.g., waveguides in a photonic integrated circuit, or PIC). In some embodiments, attachment area 13 may include grooves or channels into which individual optical waveguides 40 (e.g., individual optical fibers) may be inserted and/or held in place. In some embodiments, optical ferrule 10 may also include a light redirecting side 14, which includes a reflective surface (e.g., a mirror) which redirects incoming light rays (e.g., light traveling through and exiting from optical waveguides 40) toward a second, different direction (e.g., down toward an optical component, not shown in FIG. 1, mounted on a substrate beneath the cradle).

Figure 2:
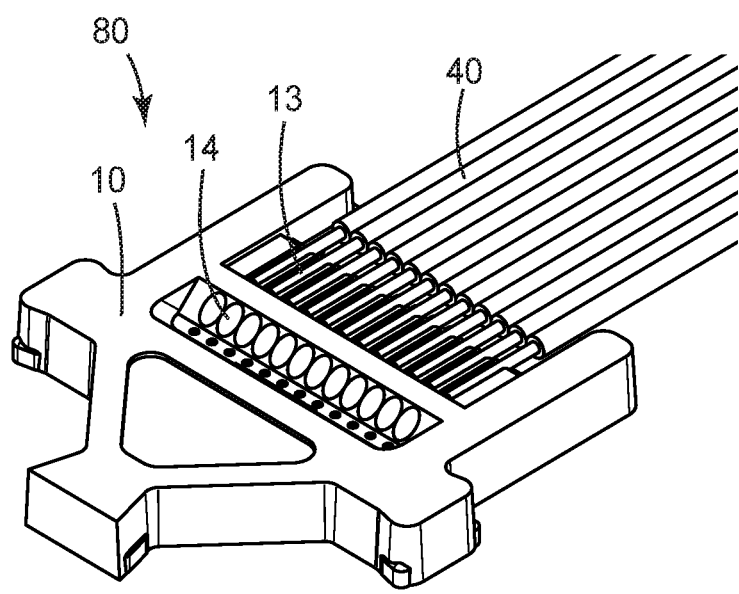
FIG. 2 is a perspective view of an optical ferrule assembly, in accordance with an embodiment of the present description.
Figure 3:
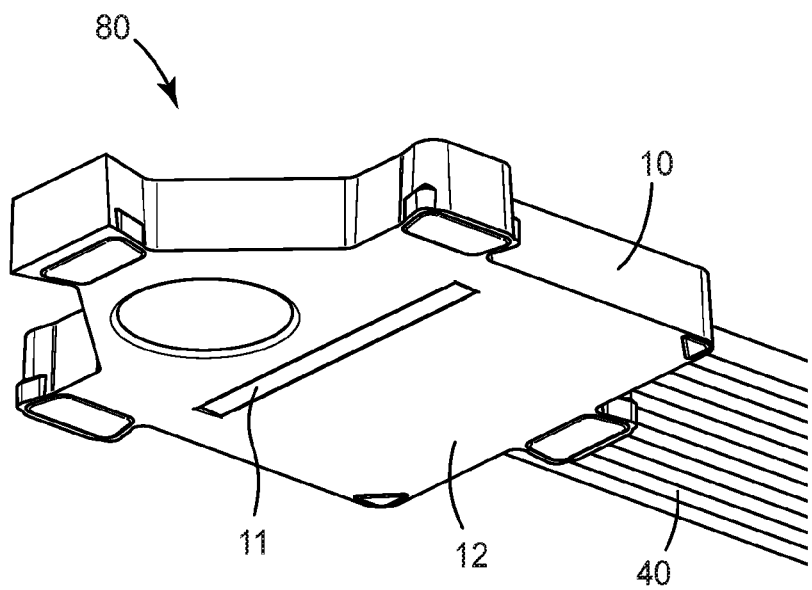
FIG. 3 is an alternate perspective view of an optical ferrule assembly, in accordance with an embodiment of the present description.

FIG. 2 is a perspective view of an optical ferrule assembly, such as the one shown in the optical assembly of FIG. 1. FIG. 3 is an alternate perspective view of the optical ferrule assembly, showing the optical ferrule from another angle. FIGS. 2 and 3 may be examined in parallel for the following discussion. In some embodiments, optical ferrule assembly 80 may include an optical ferrule 10, which includes an attachment area 13 and a light redirecting side 14. One or more optical waveguides (e.g., optical fibers) 40 may be attached to attachment area 13. In some embodiments, light redirecting side 14 may be an angled, reflective surface internal to the optical ferrule. Light exiting optical waveguides 40 and traveling through the optical ferrule 10 may impinge on the reflective surfaces of light redirecting side 14 and be redirected through reflection in a second direction (a direction different from which it exited optical waveguides 40). In some embodiments, the second direction may be at an angle such that light is redirected from light redirecting side 14, through cradle 60 (see FIG. 1), and into an optical component (see FIG. 4) mounted beneath cradle 60. It should be noted that, when the optical ferrule assembly 80 is mated with and secured by cradle 60, as shown in FIG. 1, the optical ferrule 10 is substantially in optical alignment with the optical component. In some embodiments, light may pass between the optical waveguides 40 and an optical component, in either direction, through input location 11 (e.g., an input window) on a major input surface 12 of optical ferrule 10. Light passing between optical waveguides 40 and an optical component may be redirected by light redirecting side 14, creating an angled light path between the two components.

Figure 4:
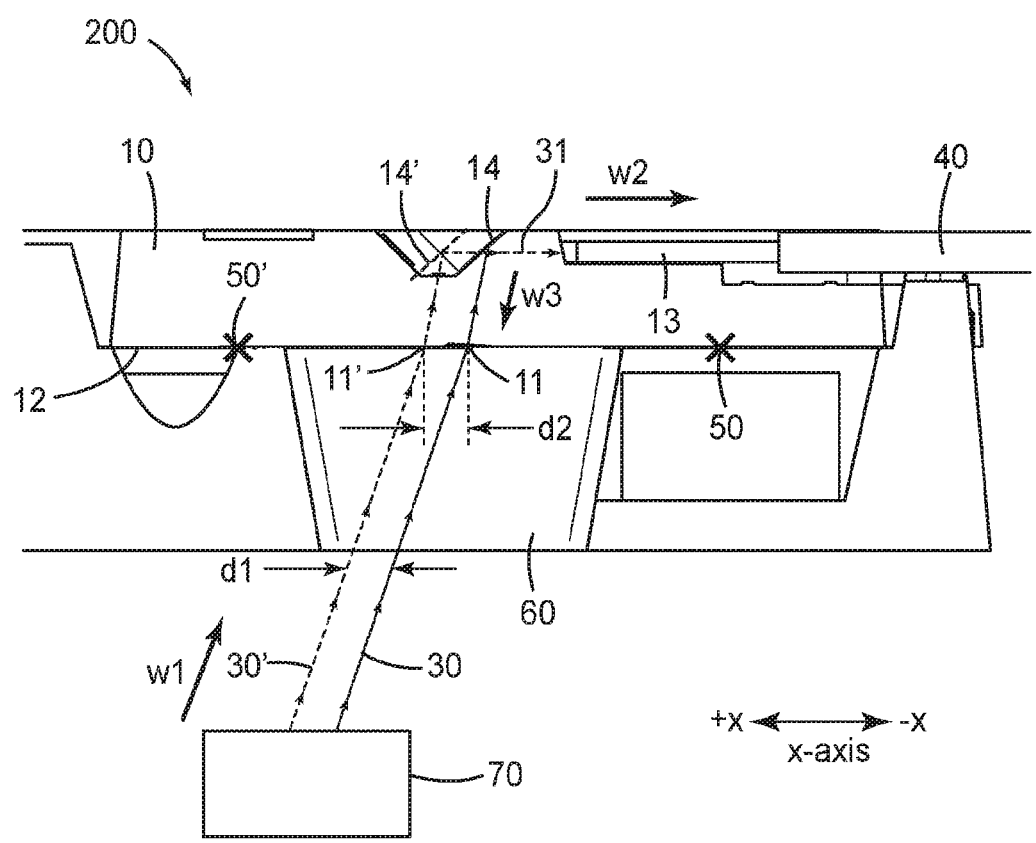
FIG. 4 is a side, cutaway view of an optical assembly in operation, in accordance with an embodiment of the present description.

FIG. 4 provides a side, cutaway view of the optical assembly of FIG. 1 in optical communication with an optical component. Optical assembly 200 includes an optical ferrule 10 which may be secured in mating cradle 60. A light ray 30 may be emitted by an optical component 70, in a first direction w1. Light ray 30 travels through an opening in cradle 60 and impinges on input location 11 (e.g., an input window) on major surface 12 of optical ferrule 10. After passing through input location 11, light ray 30 (which may be refracted as it passes through input location 11) and impinges on light redirecting side 14, which redirects light ray 30 along a different, second direction w2. Traveling along direction w2, light ray 30 enters optical waveguides 40 (attached to optical ferrule 10 at attachment area 13). Please note that light signals may also travel from optical waveguides 40 back to optical component 70 in a path opposite that shown, including third direction w3.

In some embodiments, the optical ferrule is designed such that a change in temperature of the optical assembly may cause the light ray 30 to be offset to a new path 30', as discussed elsewhere herein. In a traditional system known in the art, this translational offset from 30 to 30' can lead to misalignment of the input light ray 30 between the optical component 70 and optical waveguides 40. However, as described herein, the optical ferrule 10 may be configured such that the location of input location 11 makes a similar translational offset to 11', such that the input location 11' and optical component 70 remain substantially in alignment, such that input light ray 30' impinges on translated light redirecting side 14' and is redirected in direction w2 and passed into optical waveguides 40. In some embodiments, and for a change in temperature for the optical assembly 200, light ray 30 moves a distance d1 (to position 30') and input location 11 moves a distance d2 (to position 11') in a same direction (e.g., the +x direction as shown in FIG. 4) on the same axis (e.g., the x-axis as shown in FIG. 4), and the magnitude of d1-d2 is δ, and the maximum of the magnitudes of d1 and d2 is at least 10 times δ. Stated another way, the magnitudes of d1 and d2 may be substantially similar, especially for the expected operating temperature range of the optical assembly 200.

In some embodiments, a second, reference location 50 on or near the surface of major surface 12 of optical ferrule 10 may remain substantially fixed for the same change in temperature of optical assembly 200 that cause the offset of input light ray 30 to location 30' and input window 11 to new location 11'. In some embodiments, reference location 50 may correspond to a center of thermal expansion for optical ferrule 10. In some embodiments, reference location 50 may be defined in terms of a corresponding location on cradle 60. In some embodiments, reference location 50 may be disposed on a same side of light redirecting side 14 as attachment area 13. In other embodiment, reference location 50 (shown in FIG. 4 as 50') may be disposed on an opposite side of light redirecting side 14 than attachment area 13.

Figure 5A:
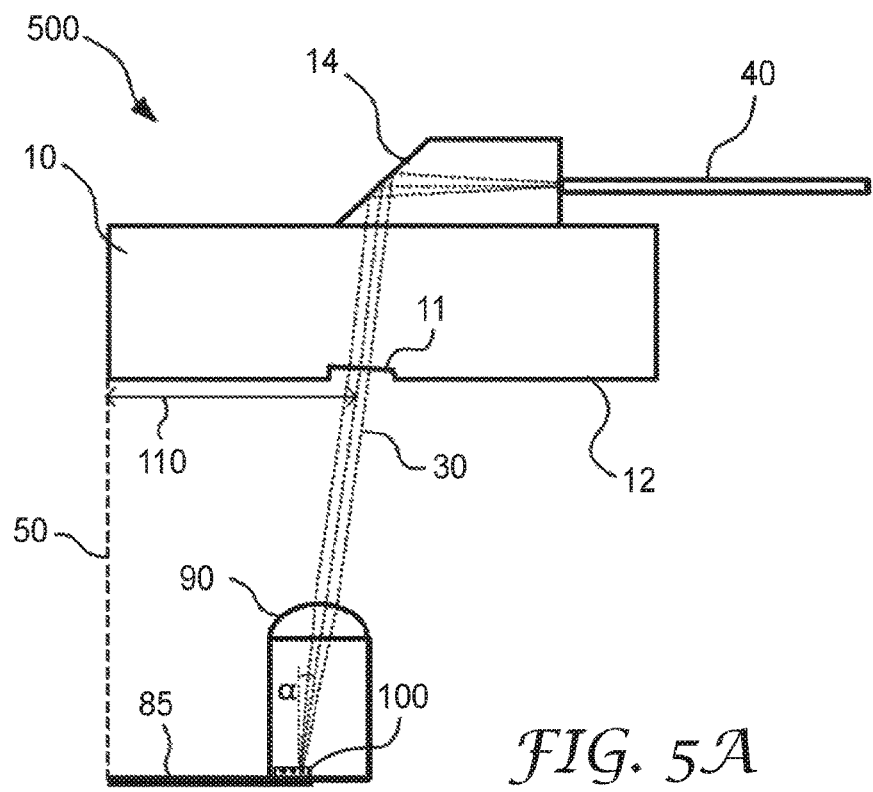
FIGS. 5A and 5B are schematic side views of an optical assembly illustrating system behavior at different temperatures, in accordance with an embodiment of the present description.
Figure 5B:
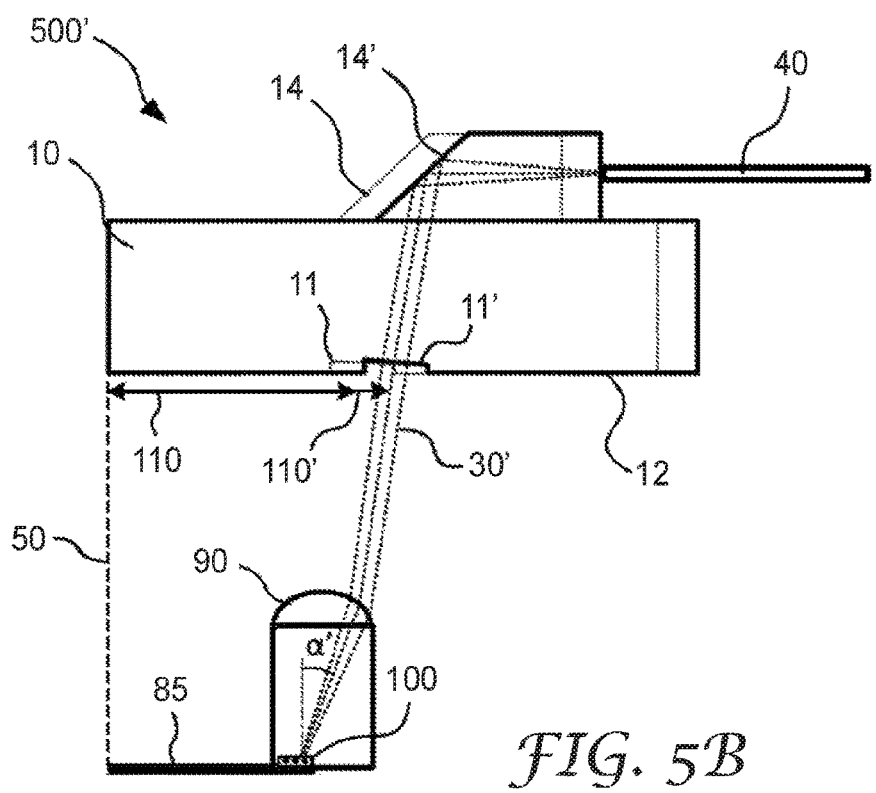

The optical components to which a ferrule interfaces can also have performance that is temperature dependent. For example, a waveguide grating coupler may be affected by a temperature change (e.g., an increase) that results in an angular shift in the light beams leaving the grating coupler. FIGS. 5A and 5B illustrate one scenario which may occur in an optical assembly using a waveguide grating coupler as the temperature changes. FIG. 5A shows optical assembly 500 including an optical ferrule 10 at a lower operating temperature. FIG. 5B shows the optical assembly 500' as it might appear at a higher temperature. It should be noted that optical ferrule 10 would typically be mated with and held in alignment by a cradle, as shown elsewhere herein, but the cradle has been removed in FIGS. 5A and 5B for clarity.

Returning to FIG. 5A, optical assembly 500 features a grating coupler 100 connected to a first waveguide 85 (e.g., a waveguide of a PIC). A collimating lens 90 is disposed so as to substantially collimates light beam 30 exiting the grating coupler 100 and, ideally, aligns it with input location 11 on major input surface 12 on optical ferrule 10. It should be noted that the three dashed lines (30) in FIGS. 5A and 5B may be thought of as three light rays representing a single light beam, or a single optical transmission between optical waveguide 40 and the optical component (e.g., first waveguide 85). Light beam 30 passes through optical ferrule 10, is redirected by light redirecting side 14, and enters optical waveguide 40 attached to optical ferrule 10. At the lower temperature depicted in FIG. 5A, light beam 30 is at an offset distance 110 from a fixed location 50 of the optical assembly, and exits optical grating 100 at angle α.

FIG. 5B illustrates the changes that occur to optical assembly 500 (becoming 500') when a temperature change (e.g., a temperature increase) occurs. When the operating temperature of optical assembly 500 increases, the exit angle of light beam 30 (becoming 30') leaving grating coupler 100 may change significantly. In some embodiments, the change in angle for change in temperature dθg/dT in degrees Kelvin (K) may be approximately 0.01°/K. This is due to change in the index of refraction of the waveguide material (typically silicon) and the thermal expansion of the pitch of grating coupler 100. The grating coupler 100 is typically disposed near the focal point of the collimating lens 90. Therefore, the change in the exit angle α' of the grating coupler 100 causes a lateral shift in light beam 30' exiting collimating lens 90. The amount of this lateral shift is proportional to the focal length of collimating lens 90. The angle of the collimated beam 30' does not change significantly (relative to collimated beam 30).

To maintain efficient coupling to the optical waveguide 40, it is desirable to move the input location 11 of optical ferrule 10 to new location 11' to match the lateral shift of light beam 30'. In some embodiments, this may be accomplished using the thermal expansion of the material of optical ferrule 10. In some embodiments, optical ferrule 10 (and cradle, not shown) may be designed to hold a reference location 50 (e.g., a center of expansion point of optical ferrule 10) in a fixed location (e.g., with respect to the cradle). Input location 11 (see FIG. 5A) may be offset from reference location 50 by a distance 110 calculated to achieve the required temperature-dependent movement of the light redirecting side 14 (to location 14'). If the offset 110 is L, the thermal expansion of the additional offset (110') is L'−L=L*CTE*ΔT, where CTE is the coefficient of thermal expansion of optical ferrule 10. Therefore, the total offset, 110+110', should be approximately L=f (dθg/dT)/CTE.

Stated another way, optical ferrule 10 is configured such that its thermal expansion causes input location 11 to shift to input location 11', and light redirecting side 14 shifts to light redirecting side 14'. Light beam 30' now passes through input location 11', are redirected by light redirecting side 14', and remain substantially in alignment with optical waveguide 40.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical assembly comprising an optical ferrule, the optical ferrule configured to receive an input light ray through an input location on a major input surface of the optical ferrule along a first direction for coupling to an optical waveguide secured to the optical ferrule, the optical ferrule comprising a reference location, such that a change in a temperature of the optical assembly causes the input light ray and the input location, but not the reference location, to move respective distances d1, d2 along a same direction along a same axis, wherein:
   a magnitude of d1-d2 is $\delta$; and
   a maximum of magnitudes of d1 and d2 is greater than 10 $\delta$.

2. The optical assembly of claim 1 having an operating temperature range, wherein a change in the temperature of the optical assembly over the operating temperature range causes the input light ray and the input location, but not the reference location, to move respective distances d1, d2 along a same direction along a same axis, wherein:
   a magnitude of d1-d2 is $\delta$; and
   a maximum of magnitudes of d1 and d2 is greater than 10 $\delta$.

3. The optical assembly of claim 2, wherein the operating temperature range of the optical assembly is from about −40 degrees C. to about 100 degrees C.

4. The optical assembly of claim 1, wherein a change of at least 10 degrees in the temperature of the optical assembly causes the input light ray and the input location, but not the reference location, to move respective distances d1, d2 along the same direction along the same axis, wherein:
   the magnitude of d1-d2 is $\delta$; and
   the maximum of magnitudes of d1 and d2 is greater than 10 $\delta$.

5. The optical assembly of claim 1, wherein the reference location is within about 10 microns of a major surface of the optical ferrule.

6. The optical assembly of claim 5, wherein the major surface is the major input surface.

7. The optical assembly of claim 1, wherein the optical ferrule is configured to receive the input light ray along the first direction and redirect the received light along a different second direction.

8. The optical assembly of claim 1, wherein the optical ferrule is configured to receive the input light ray from an optical component.

9. The optical assembly of claim 8, wherein the optical component comprises one or more of a photonic integrated circuit, a lens, a prism, a grating, a sensor, and a vertical cavity surface emitting laser.

10. The optical assembly of claim 1, wherein the change in the temperature of the optical assembly causes the input light ray and the input location to move away from the reference location.

11. The optical assembly of claim 1, wherein the optical ferrule comprises an attachment area for securing one or more optical waveguides thereto, and a light redirecting side for receiving light along a first direction from an optical waveguide secured to the attachment area and redirecting the received light along a different second direction.

12. The optical assembly of claim 1, wherein the reference location and the attachment area are positioned on a same side of the light redirecting side.

13. The optical assembly of claim 1, wherein the reference location and the attachment area are positioned on opposite sides of the light redirecting side.

14. The optical assembly of claim 1 further comprising a cradle securing the optical ferrule therein and configured to align the optical ferrule to an optical component.

15. The optical assembly of claim 14, wherein the optical component comprises one or more of a photonic integrated circuit, a lens, a prism, an optical slab, a grating, a sensor, and a vertical cavity surface emitting laser.

16. The optical assembly of claim 14, wherein the cradle defines the reference location of optical ferrule.

17. The optical assembly of claim 14, wherein a coefficient of thermal expansion of the cradle is less than a coefficient of thermal expansion of the optical ferrule by at least a factor of 10.

18. The optical assembly of claim 14, wherein a change in a temperature of the optical component causes the input light ray to move, and a change in a temperature of the optical ferrule causes the input location to move.

19. An optical assembly comprising:
   an optical ferrule having an optical waveguide secured thereto; and
   an optical component, the optical ferrule configured to receive light from the optical component and couple the received light to the optical waveguide, such that:
      when the optical ferrule and the optical component are at a temperature T1, the optical ferrule is aligned to the optical component to optimize an optical coupling of the received light to the optical waveguide;
      moving the received light by a first distance while keeping the temperature of the optical ferrule and the optical component at T1, reduces the optical coupling of the received light to the optical waveguide by at least 10%; and
      changing the temperature of the optical ferrule and the optical component from T1 to cause the received light to move by the first distance, reduces the optical coupling of the received light to the optical waveguide by less than about 10%.

20. The optical assembly of claim 19, wherein the optical waveguide is an optical fiber comprising a core having a diameter between about 5 to 15 microns.

* * * * *